US008644158B2

(12) United States Patent
Ni

(10) Patent No.: US 8,644,158 B2
(45) Date of Patent: Feb. 4, 2014

(54) METHOD AND APPARATUS FOR SELECTING NETWORK ACCESS PROVIDER

(75) Inventor: Hui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 13/204,546

(22) Filed: Aug. 5, 2011

(65) Prior Publication Data

US 2011/0292905 A1   Dec. 1, 2011

Related U.S. Application Data

(63) Continuation of application No. PCT/CN2010/070350, filed on Jan. 25, 2010.

(30) Foreign Application Priority Data

Feb. 13, 2009   (CN) .......................... 2009 1 0105444

(51) Int. Cl.
*G01R 31/08*   (2006.01)

(52) U.S. Cl.
USPC .......................................... 370/235; 370/335

(58) Field of Classification Search
None
See application file for complete search history.

(56) References Cited

U.S. PATENT DOCUMENTS

| 6,714,790 | B2* | 3/2004 | Heckard et al. ............ 455/456.1 |
| 6,982,962 | B1 | 1/2006 | Lunsford et al. |
| 7,042,988 | B2* | 5/2006 | Juitt et al. .................. 379/88.17 |
| 7,433,311 | B1* | 10/2008 | Kalyanasundaram et al. ............. 370/235 |
| 8,132,256 | B2* | 3/2012 | Bari .............................. 726/21 |
| 8,213,391 | B2* | 7/2012 | Czaja et al. ................... 370/335 |
| 8,428,603 | B2* | 4/2013 | Kim et al. ..................... 455/444 |
| 2008/0235048 | A1* | 9/2008 | Rantanen et al. ................ 705/1 |
| 2010/0251330 | A1* | 9/2010 | Kroeselberg et al. ............. 726/3 |
| 2011/0292905 | A1* | 12/2011 | Ni ............................... 370/329 |

FOREIGN PATENT DOCUMENTS

| CN | 1870554 A | 11/2006 |
| CN | 101080087 A | 11/2007 |
| CN | 101237673 A | 8/2008 |
| WO | WO 2008/114233 A1 | 9/2008 |

OTHER PUBLICATIONS

Written Opinion of the International Searching Authority in corresponding International Patent Application No. PCT/CN2010/070350 (Apr. 22, 2010).
"IEEE 802.16/2009—Part 16: Air Interface for Broadband Wireless Access Systems," IEEE Standard, 2009, IEEE, Washington, DC, pp. 1-17.

(Continued)

*Primary Examiner* — Robert Wilson
(74) *Attorney, Agent, or Firm* — Leydig, Voit & Mayer, Ltd.

(57) ABSTRACT

Example embodiments of the present invention provide systems, method, and apparatuses for selecting a network access provider (NAP). In one embodiment, a worldwide interoperability for microwave access (WiMAX) femtocell access point (WFAP) sends an NAP request message to a network service provider (NSP). The WFAP receives an NAP response message returned by the NSP, where the NAP response message carries NAP information determined by the NSP. Thereafter, the WFAP can establish a connection with the NAP according to the received NAP information. In other words, independently of the macro network, the WFAP can determine the NAP providing a radio resource for the WFAP and provide radio access service for users of multiple NSP.

13 Claims, 7 Drawing Sheets

(56) References Cited

OTHER PUBLICATIONS

1st Office Action in corresponding Korean Patent Application No. 10-2011-7017460 (Oct. 11, 2012).
"WMF-T33-118-R016V01—WiMax Forum Network Architeture: Architecture, Detailed Protocols and Procedures; Femtocells Core Specification," Nov. 30, 2010, WiMax Forum, Solona Beach, CA, pp. 1-56.
1st Office Action in corresponding Chinese Patent Application No. 201010107659.9 (Jan. 5, 2013).
International Search Report of PCT Patent Application No. PCT/CN2010/070350, mailed Apr. 22, 2010, 3 pages total.
WiMAX Forum Network Architecture—Stage 3—Detailed Protocols and Procedures—Release 1, Version 1.3.0, dated Nov. 2, 2008, 692 pages total.

* cited by examiner

METHOD AND APPARATUS FOR SELECTING NETWORK ACCESS PROVIDER

CROSS-REFERENCE TO RELATED APPLICATIONS

This application is a continuation of International Application No. PCT/CN2010/070350, filed on Jan. 25, 2010, which claims priority to Chinese Patent Application No. 200910105444.0, filed on Feb. 13, 2009, both of which are hereby incorporated by reference in their entireties.

FIELD OF THE INVENTION

The present invention relates to the field of communication technologies, and in particular, to a method and an apparatus for selecting a network access provider (NAP).

BACKGROUND OF THE INVENTION

Mobile communication networks are dedicated to providing higher packet transmission capabilities for users to meet the fast growing data service requirements of mobile users. Mobile worldwide interoperability for microwave access (WiMAX) networks, which are based on IEEE 802.16 radio access technologies, can provide mobile users with high-speed data transmission capabilities; and therefore, attract worldwide attention. As an extension to the wireless broadband access technology, a mobile WiMAX network additionally supports terminal mobility, which enables a mobile terminal to maintain service continuity during switching or roaming between different access points (APs); thus, meeting the requirements for commercial mobile communication services.

Operators that provide services for WiMAX networks are categorized into NAPs or network service providers (NSPs). NAPs own rights to radio spectrum resources and implement radio signal coverage through base stations to provide air interface access for mobile users. NSPs maintain subscription information of users and provide Internet connection services for authenticated subscribers of this and other similar services. Through the radio access services provided by NAPs, users are connected to NSPs, and then to the Internet.

In sparsely populated areas, few base stations are deployed, each covering a wide area, and the signals can barely penetrate through the thick walls of buildings. As a result, some indoor users cannot receive radio signals well. To solve the dead coverage problem in mobile communications, the concept of femtocell is introduced in the WiMAX system.

The femtocell is a home base station. It can be deployed indoors to effectively solve dead coverage of a macro network and reduce the air interface load of the macro network. In addition, because a femtocell serves only few users, the users that access the network through the femtocell may get a higher air interface or wireless data transmission rate and quality of service (QoS); while also enjoying a lower service tariff.

A WiMAX femtocell access point (WFAP) accesses the Internet through a fixed network such as a digital subscriber line (DSL) at a user's home. After being authenticated by an NSP, the WFAP opens the air interface according to the radio resource granted by the NAP, such as a frequency band, and provides radio access for the home user. The user can enjoy the WiMAX service under the WFAP and perform seamless handover between the WFAP and the macro base station.

Presently, the WFAP is considered user equipment (UE) that is NSP specific; i.e., each WFAP belongs to a only a single NSP. Accordingly, current WFAP cannot select, communicate, or otherwise manage the air interfaces of multiple NAPs; however, there currently exists a need for such selectivity and maintenance. For example, an NSP may wish to establish business relationships with multiple NAPs, allowing these NAPs to provide a radio spectrum resource for the WFAP. Because, however, access for a mobile terminal or device is tied to a specific NAP, and because each WFAP is NSP specific, the WFAP cannot select an NAP that provides radio resource configuration information for other NSPs. Likewise, a WFAP can open an air interface according to the granted radio resource of more than a single NAP.

SUMMARY OF THE INVENTION

Embodiments of the present invention provide for systems, methods and apparatus used in selecting an network access point (NAP) for a mobile user of a WiMax femtocell access point (WFAP) or home base station independently of any macro network used to provide radio resources for a femtocell or radio access for a user of a specific NSP.

For example, one embodiment of the present invention provides a system, method and apparatus for selecting a NAP, wherein a WFAP, home base station or femtocell sends an NAP request message to an network service provide NSP. Thereafter, the WFAP, receives an NAP response message returned by the corresponding NSP, where the NAP response message carries NAP information determined by the NSP. This then allows the WFAP to establish a connection with the NAP according to the received NAP information.

In accordance with another example embodiment of the present invention, a WFAP related apparatus is configured for selecting, accessing and managing connections to multiple NPSs. Such example apparatuses include a requesting unit, configured to send an NAP request message to an NSP and a receiving unit, configured to receive an NAP response message returned by the NSP, where the NAP response message carries NAP information determined by the NSP. The WFAP related apparatus also comprises a connection establishing unit, configured to establish a connection with an NAP according to the received NAP information.

In accordance with yet another example embodiment of the present invention, NAP selection apparatus is provided, which includes: (i) a receiving unit, configured to receive an NAP request message sent by a WFAP; and (ii) a determining unit, configured to determine NAP information; and a sending unit, configured to return an NAP response message to the WFAP, where the NAP response message carries the NAP information determined by the determining unit. Similar to other embodiments described herein, the request message sent by the WFAP to the NSP may carry information for determining an NAP, whereupon the NSP determines the NAP according to the local NAP selection information and the information in the request message. Thereby, independently of any particular macro network, the WFAP can determine the NAP providing a radio resource for the WFAP and provide radio access service for users of multiple NSP.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EMBODIMENTS

Figure 1:
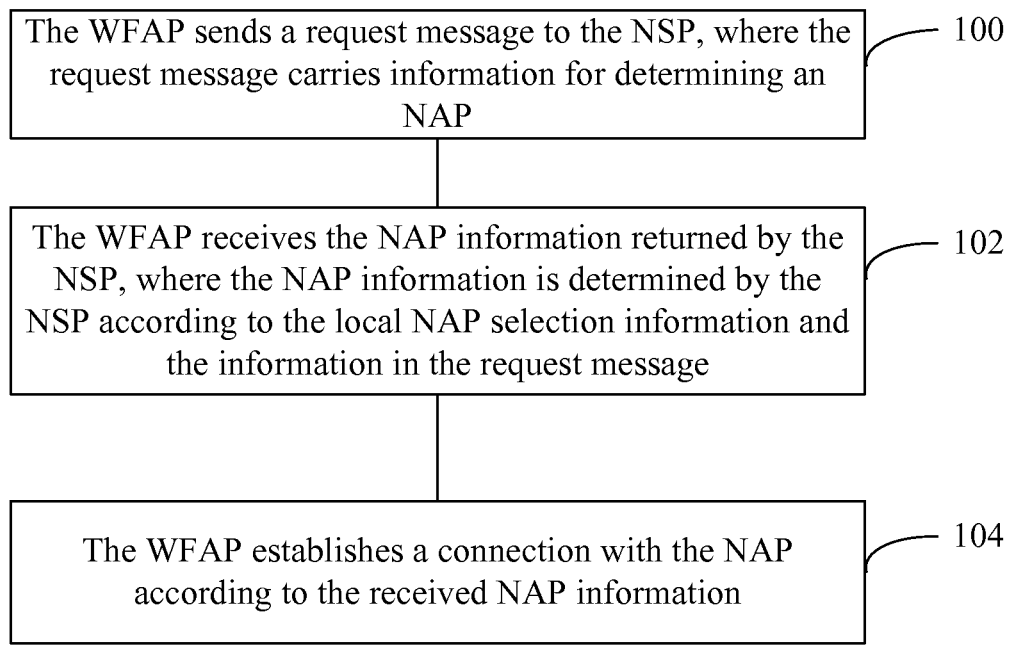
FIG. 1 is a schematic flowchart of a method for selecting an NAP according to an example embodiment of the present invention.

To make the objectives, technical solution and merits of the present invention clearer, the following describes the embodiments of the present invention in detail with reference to the accompanying drawings. The present invention extends to methods, systems, apparatuses and computer program products for selecting an network access point by a femtocell or home base station, independent of the macro network used for radio access resources of the femtocell or the specific network service provider of a mobile user. The embodiments of the present invention may comprise a special purpose or general-purpose computer including various computer hardware or modules, as discussed in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described above are example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

As previously mentioned, the present invention provides for systems, methods and apparatuses for allowing a femtocell or home base unit (e.g., a WiMax femtocell access point or WFAP) to utilize other network access points (NAPs) for various network service providers (NSPs) independent of the macro network used for radio access resources of the femtocell or for providing services to a user. Note that the terms femtocell, home base station and/or WFAP is used herein interchangeably. Accordingly, the use of the term WFAP in the specification and claims should be broadly construed to encompass any type of femtocell or home base station, and not just those limited to WiMAX unless otherwise specifically claimed.

In accordance with one embodiment, a femtocell, home base station, (herein "WFAP") is provided for selecting an NAP. In such embodiment, a WFAP includes: (i) a requesting unit, configured to send an NAP request message to an NSP; (ii) a receiving unit, configured to receive an NAP response message returned by the NSP, where the NAP response message carries NAP information determined by the NSP; (iii) and a connection establishing unit, configured to establish a connection with an NAP according to the received NAP information.

In accordance with another embodiment of the present invention provides a WFAP, including: a requesting unit, configured to send a request message to an NSP, where the request message carries information for determining an NAP; a receiving unit, configured to receive NAP information returned by the NSP, where the NAP information is determined by the NSP according to local NAP selection information and the information in the request message; and a connection establishing unit, configured to establish a connection with the NAP according to the received NAP information.

Further in accordance with yet another embodiment, the WFAP may include: (i) a first information collecting unit, configured to collect location information of the WFAP and send the information to the requesting unit; (ii) a second information collecting unit, configured to collect NAP information which is determined by a user and includes at least one NAP ID or NAP information which is determined by the user and includes at least two NAP IDs and corresponding priorities, and send the information to the requesting unit; and (iii) a third information collecting unit, configured to determine NAP information which includes at least one NAP ID according to the current radio signal or NAP information which includes at least two NAP IDs and corresponding priorities according to the current radio signal, and send the information to the requesting unit. Further, the WFAP may include a radio resource obtaining unit, configured to obtain the radio resource granted by the NAP.

In accordance with yet another embodiment of the present invention, an apparatus is provided for selecting an NAP. Such apparatus may include: (i) a receiving unit, configured to receive an NAP request message sent by a WFAP; and (ii) a determining unit, configured to determine NAP information; and a sending unit, configured to return an NAP response message to the WFAP, where the NAP response message carries the NAP information determined by the determining unit. According to the location information of the WFAP, subscription information of the user; and/or NSP-NAP business agreement, the determining unit is specifically configured to determine the NAP that provides an air interface resource for the WFAP. Of course, other information may also be used in selecting the NAP; and therefore, the use of any specific information or combination thereof is used herein for illustrative purposes only and is not meant to limit or otherwise narrow the scope of the present invention unless otherwise specifically claimed.

In accordance with still another embodiment of the present invention, another apparatus is provided for selecting an NAP. In this embodiment, the apparatus includes: (i) a receiving unit, configured to receive a request message sent by a WFAP, where the request message carries information for determining an NAP; (ii) a storing unit, configured to store local NAP selection information; and (iii) a determining unit, configured to determine the NAP according to the local NAP selection information stored by the storing unit and the information in the request message; and a sending unit, configured to send the NAP information determined by the determining unit to the WFAP. Further, the apparatus includes an authenticating unit, configured to authenticate the WFAP when the request message received by the receiving unit carries the ID of the WFAP. Further, the apparatus includes an interacting unit, configured to interact with the NAP determined by the determining unit to obtain the radio resource information granted by the NAP for the WFAP and send the information to the sending unit. Accordingly, the sending unit is further configured to send the radio resource information to the WFAP. It should be noted that in this particular embodiment, the apparatus is typically located on the NSP side.

In yet another exemplary embodiment of the present invention, the request message sent by the WFAP to the NSP carries information for determining an NAP, and the NSP determines the NAP according to the local NAP selection information, the information in the request message, or both. Accordingly, independently of the macro network, the WFAP can determine the NAP providing a radio resource for the WFAP and further obtain the granted radio resource from the NAP to provide radio access service for the user.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowcharts or diagram(s) for FIGS. 1-7 are used to indicate the desired specific use of such terms.

As previously mentioned, FIGS. 1-7 illustrates flowcharts or diagrams for various exemplary embodiments of the present invention. The following description of FIGS. 1-7 will occasionally refer to corresponding elements from the above described apparatus and systems. Although reference may be made to a specific element from the description, such references are used for illustrative purposes only and are not meant to limit or otherwise narrow the scope of the described embodiments unless otherwise explicitly claimed.

Turning now to the Figures, FIG. 1 shows an exemplary process or procedure for selecting an NAP according to an embodiment of the present invention. As shown, Step 100: The WFAP sends a request message to the NSP, where the request message carries information for determining an NAP. The information for determining an NAP may be at least one of the following: location information of the WFAP; NAP information which is determined by the user and includes at least one NAP ID and/or NAP information which is determined by the WFAP according to the current radio signal and includes at least one NAP ID; NAP information which is determined by the user and includes at least two NAP IDs and corresponding priorities and/or NAP information which is determined by the WFAP according to the current radio signal and includes at least two NAP IDs and corresponding priorities. It should be noted that the request message may further carry a WFAP ID, so that the NSP can authenticate the WFAP according to this ID.

Step 102: The WFAP receives the NAP information returned by the NSP, where the NAP information is determined by the NSP according to the local NAP selection information and the information in the request message. The local NAP selection information includes at least one of the following: subscription information of the user and NSP-NAP business agreement. The NAP information returned by the NSP includes at least one of the following: NAP ID, domain name of a network element (NE) in the NAP, and IP address of the NE in the NAP.

Step 104: The WFAP establishes a connection with the NAP according to the received NAP information. It should be noted that after the connection is established, the WFAP may obtain the granted radio resource directly from the NAP according to the received NAP information and use the radio resource to open the air interface; or, the WFAP may obtain the granted radio resource from the NAP according to the granted radio resource information sent by the NSP and use the radio resource to open the air interface, where the granted radio resource information is obtained by the NSP from the NAP.

In this embodiment, the request message sent by the WFAP to the NSP carries information for determining an NAP, and the NSP determines the NAP according to the local NAP selection information and the information in the request message. Thereby, independently of the macro network, the WFAP can determine the NAP providing a radio resource for the WFAP and further obtain the granted radio resource from the NAP to provide radio access service for the user. The method for selecting an NAP is further described below with reference to some specific application scenarios.

Scenario 1

Figure 2:
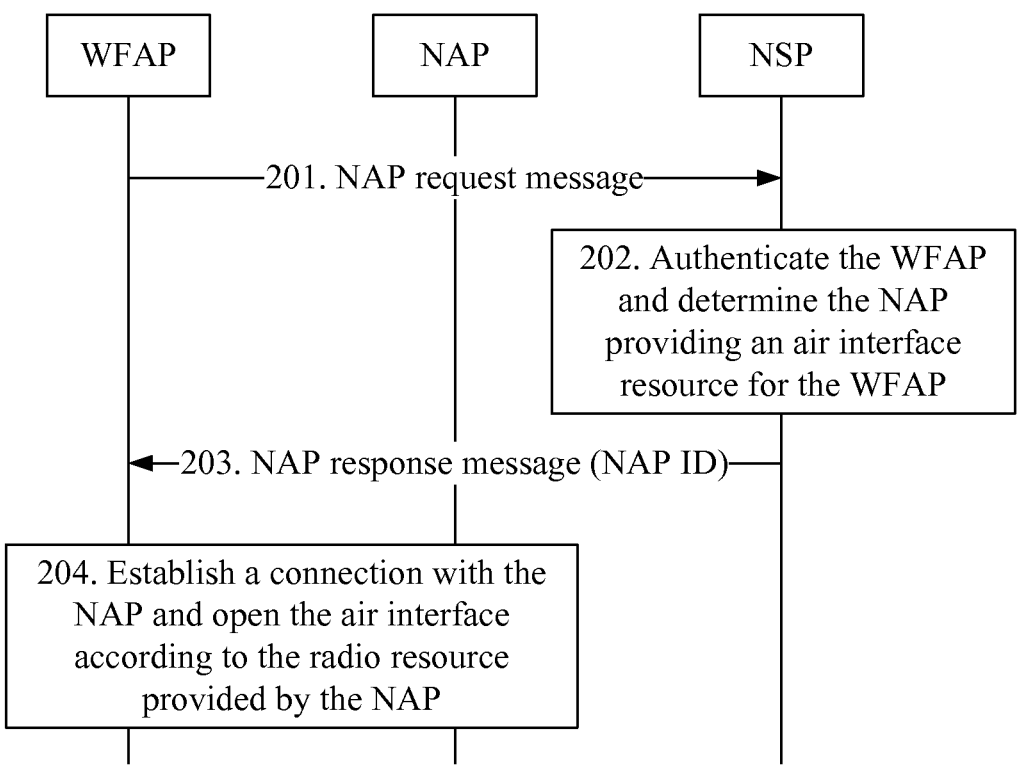
FIG. 2 is a schematic flowchart of steps used for an NSP to select an NAP in accordance with another example embodiment of the present invention.

In the application scenario shown in FIG. 2, the WFAP sends a request message to the NSP, where the request message does not carry an NAP ID. Nevertheless, the NSP still determines the NAP for providing an air interface resource and notifies the WFAP of the NAP ID.

Specifically, after being powered on, the procedure first includes Step 201 wherein the WFAP sends an NAP request message to the NSP through a fixed network connection, e.g., a digital subscriber line (DSL). The NAP request message usually carries a WFAP ID; and optionally carries the current location information of the WFAP.

In Step 202, the NSP authenticates the WFAP and determines the NAP providing an air interface resource for the WFAP. In the process of determining the NAP, the NSP may consider factors such as the subscription information of the user, location of the WFAP, and NSP-NAP business agreement. Of course, other factors and information may be used in determining an appropriate NAP; and therefore, the use of the above considerations for determining an NAP is used herein for illustrative purposes only and is not meant to limit or otherwise narrow the scope of the present invention unless otherwise specifically claimed.

Next, in Step 203, The NSP sends an NAP response message to the WFAP. The NAP response message typically carries the ID of the NAP selected in the previous step.

Then, in Step 204, The WFAP establishes a connection with the NAP according to the NAP information sent by the NSP and opens the air interface according to the radio resource provided by the NAP.

Scenario 2

Figure 3:
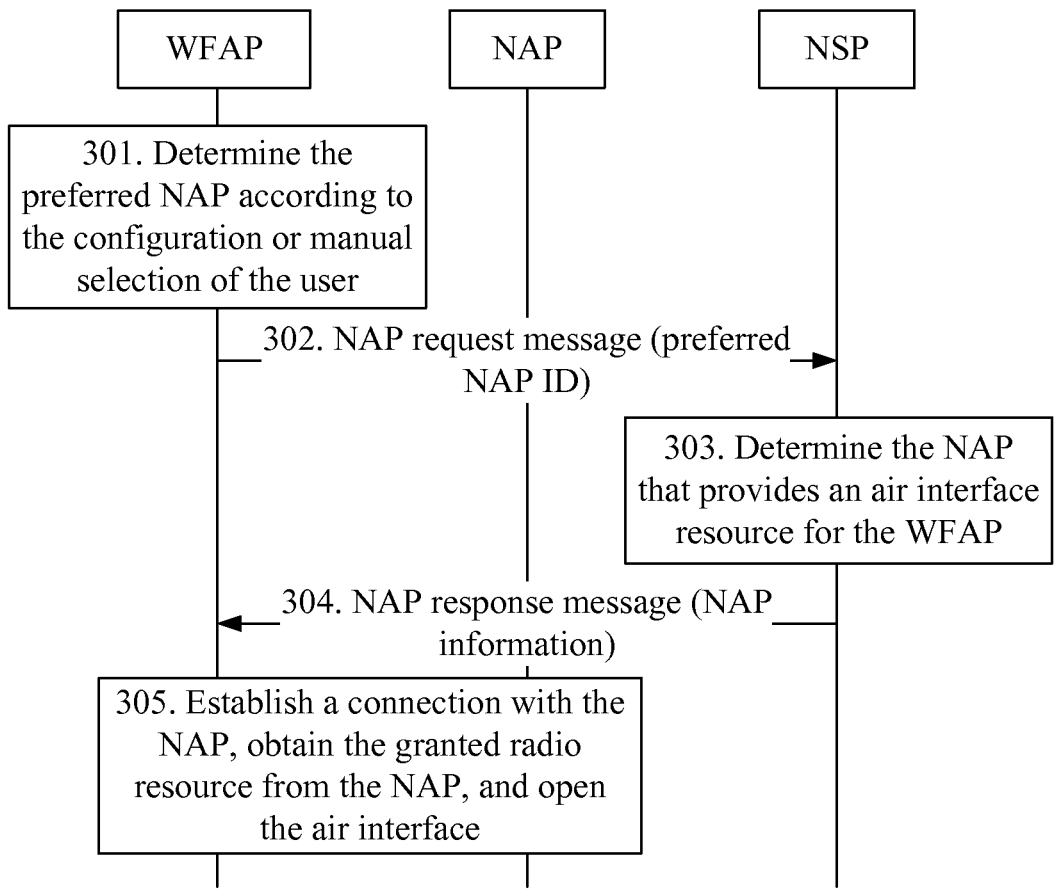
FIG. 3 is a schematic flowchart of steps used for a user selected NAP in accordance with example second embodiments of the present invention.

In the application scenario shown in FIG. 3, the user provides information about a preferred NAP. whereupon the WFAP sends a request message carrying the preferred NAP information to the NSP. The NSP then determines the NAP providing an air interface resource and notifies the WFAP of the determined NAP information, whereupon the WFAP obtains the granted radio resource from the NAP.

More specifically, the procedure in FIG. 3 includes the Step 301, wherein, after being powered on, the WFAP determines the preferred NAP according to the configuration or manual selection of the user.

In Step 302, the WFAP sends an NAP request message to the NSP, wherein the NAP request message carries the preferred NAP ID.

According to on or more of the information provided in the received request message, the local NAP selection information, or the subscription information of the WFAP user, in Step 303 the NSP determines the NAP that provides an air interface resource for the WFAP.

Then, in Step 304, the NSP sends an NAP response message to the WFAP. The NAP response message may carry information about the NAP selected in the previous step, such as the NAP ID or the domain name of an access gateway.

Accordingly, in Step 305, the WFAP establishes a connection with the NAP according to the NAP information sent by the NSP, obtains the granted radio resource from the NAP, and opens the air interface in accordance therewith.

Scenario 3

Figure 4:
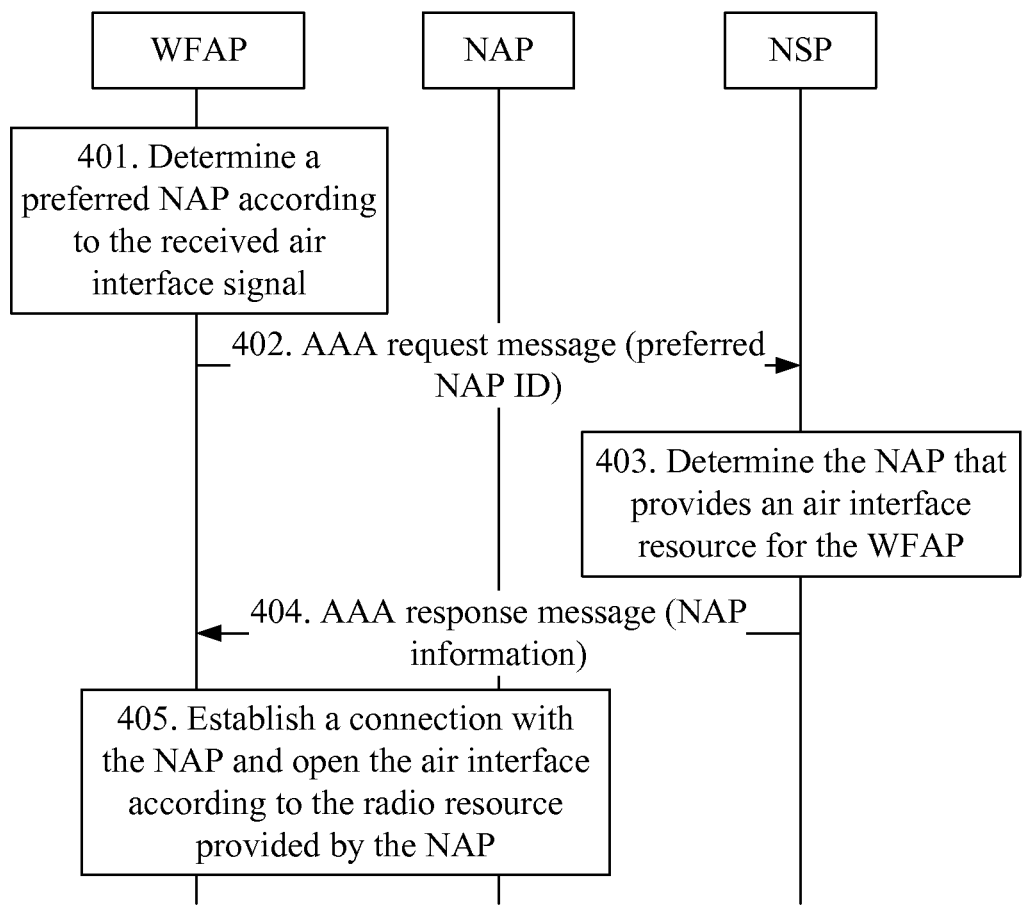
FIG. 4 is a schematic flowchart of steps used for a femtocell or WFAP to determine a preferred NAP in accordance with yet another example embodiment of the present invention.

In the application scenario shown in FIG. 4, the WFAP determines a preferred NAP according to the signal of the current base station and sends a request message carrying the preferred NAP information. The NSP then determines the NAP and notifies the WFAP of the NAP ID. Note that in this embodiment, the NAP request, the NAP response, or both, are implemented by authentication, authorization and accounting (AAA) messages.

More specifically, the procedure in FIG. 4 includes Step 401, wherein after being powered on, the WFAP receives a broadcast message sent by a macro base station, and determines a preferred NAP. Note that such preference and selection of an NAP may be based on various information such as a base station that has best signal strength. Of course, other factors may also determine the appropriate NAP; and therefore, the use of the base station signal quality as selecting a preferred NAP is used herein for illustrative purposes and is not meant to limit or otherwise narrow the scope of the present invention unless otherwise specifically claimed.

In such embodiment, in Step 402, The WFAP sends an AAA request message to the NSP. Note that the AAA request message typically carries the preferred NAP ID. According to the information provided in the received request message and/or the local NAP selection information, in Step 403 the NSP determines the NAP that provides an air interface resource for the WFAP.

Next, in Step 404, The NSP may send an AAA response message to the WFAP, wherein the AAA response message carries information about the NAP selected in the previous step—e.g., the NAP ID, the IP address of an access gateway, etc. Accordingly, in Step 405, the WFAP establishes a connection with the NAP according to the NAP information sent by the NSP, obtains the granted radio resource from the NAP, and opens the air interface.

Scenario 4

Figure 5:
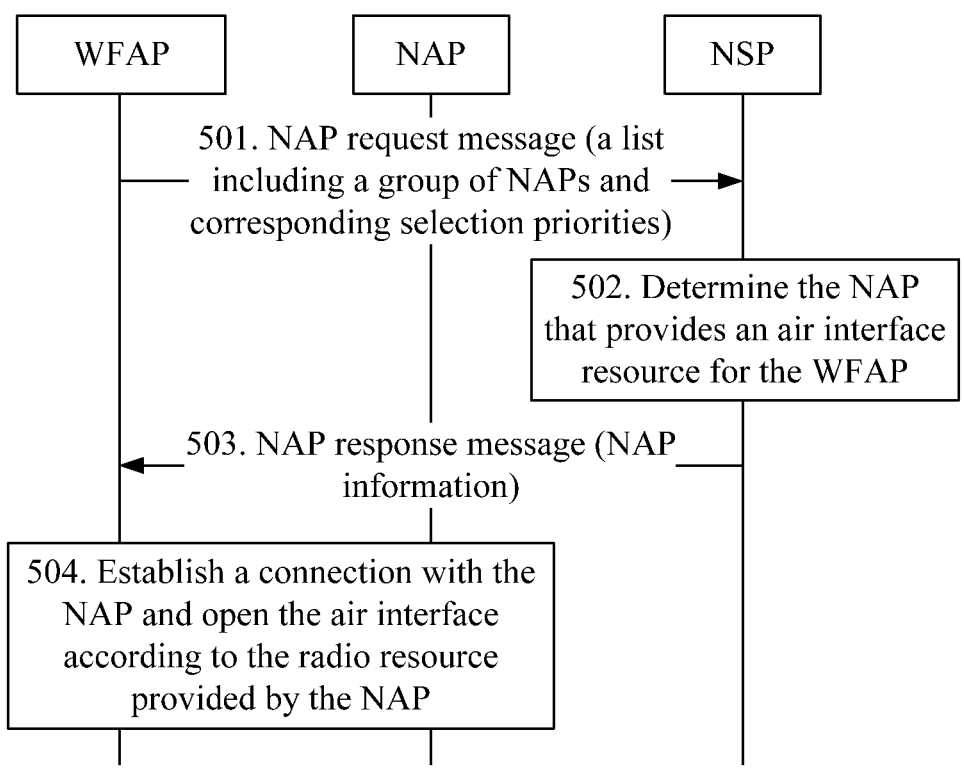
FIG. 5 is a schematic flowchart of steps used for selecting an NAP from group of listed NAPs and corresponding selection priorities in accordance with an example embodiment of the present invention.

In the application scenario shown in FIG. 5, the WFAP sends a request message carrying a group of NAP information—along with a selection of priorities. The NSP then uses the information provided for determining an appropriate NAP for providing an air interface resource and notifies the WFAP of the NAP information.

Specifically, in Step 501 of FIG. 4, the WFAP sends an NAP request message to the NSP. The NAP request message carries a list that includes a group of NAP IDs and a corresponding selection of priorities. The priorities in the list may be determined according to local policies such as the user configuration or air interface signal strength. Of course, the list of priorities may be based on other considerations and forms of information. As such, any information used in setting a priority listing according to example embodiments is used herein for illustrative purposes only and is not meant to limit or otherwise narrow the scope of the present invention unless otherwise explicitly claimed. In fact, the selection priorities in the list are optional; and therefore, the list or NAP request may include only NAP IDs.

According to the information sent in the NAP request message, in Step 502, the NSP determines the NAP that provides an air interface resource for the WFAP.

Then, in Step 503, the NSP sends an NAP response message to the WFAP. The NAP response message carries information about the NAP selected in the previous step, such as the NAP ID, the IP address of an access gateway, or other information for identifying a selected NAP. Thereafter, in Step 504, the WFAP establishes a connection with the NAP according to the NAP information sent by the NSP, obtains the granted radio resource from the NAP, and opens the air interface.

Scenario 5

Figure 6:
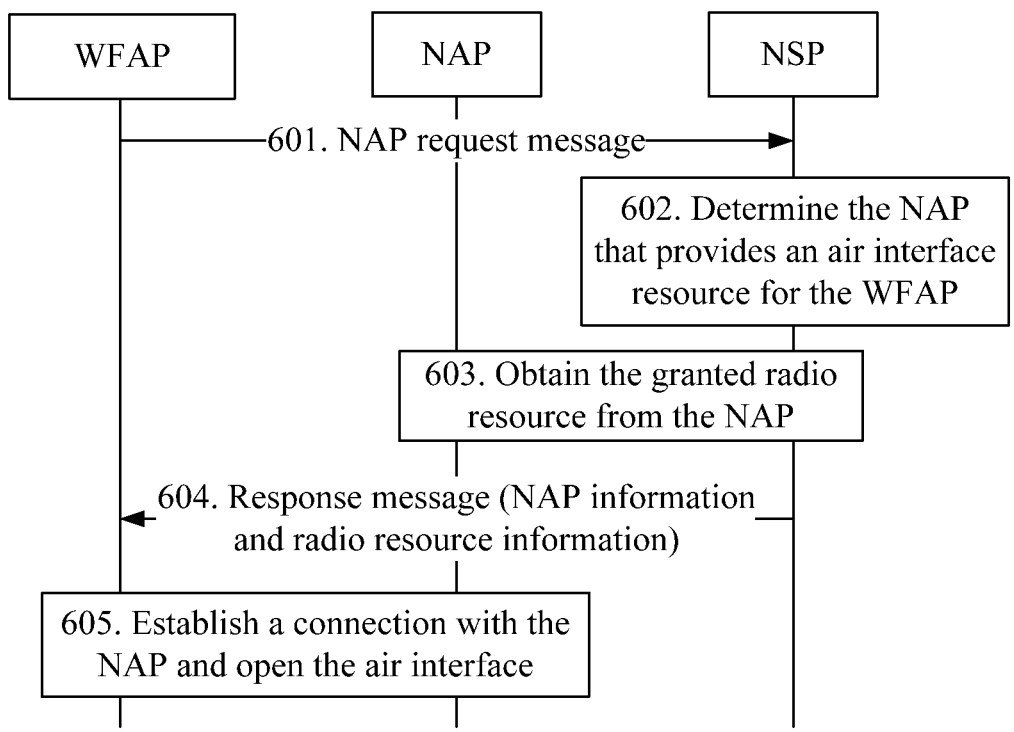
FIG. 6 is a schematic flowchart of steps used for selecting an NAP that provides an air interface resources in accordance with still another embodiment of the present invention.

In the application scenario shown in FIG. 6, after the NSP determines the NAP that provides an air interface resource, the NSP obtains the granted radio resource information from the NAP and notifies the WFAP of the NAP information and/or the granted radio resource information. More specifically, in Step 601, and after being powered on, the WFAP sends an NAP request message to the NSP. According to the information provided in the received request message, in Step 602, the NSP determines the NAP that provides an air interface resource for the WFAP.

In Step 603, the NSP contacts the NAP to obtain the granted radio resource information from the NAP for the WFAP.

Then, in Step 604, the NSP sends a response message to the WFAP, which carries the NAP information determined in the previous step and the radio resource information granted by the NAP.

In Step 605, the WFAP establishes a connection with the NAP according to the NAP information provided in the response message and opens the air interface according to the radio resource provided in the message. Note that in this embodiment, the step in which the NSP obtains the granted radio resource from the NAP is also applicable to the foregoing embodiments.

Scenario 6

Figure 7:
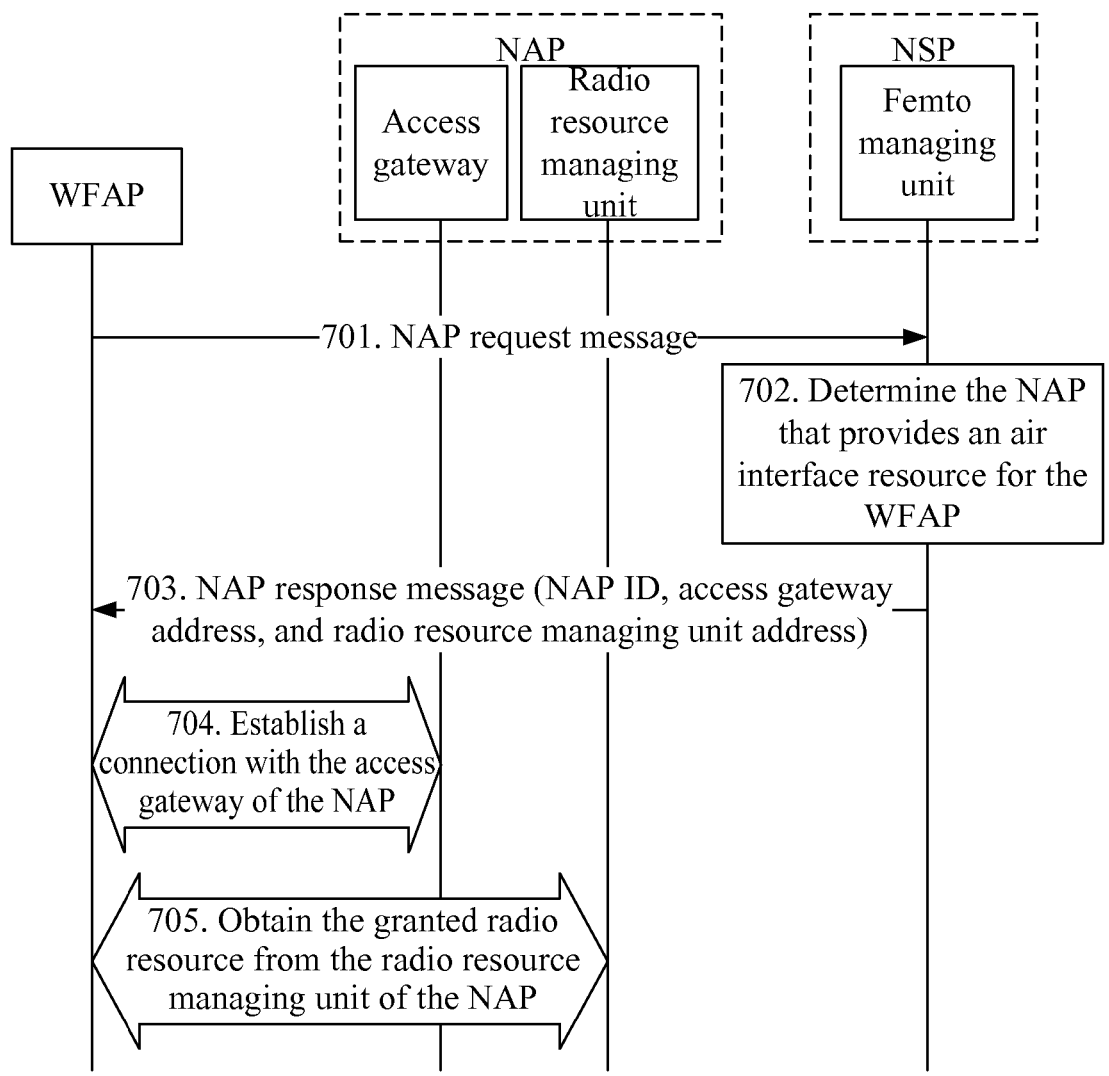
FIG. 7 is a schematic flowchart of steps used in allowing a femto managing unit of the NSP to determine an NAP in accordance with another example embodiment of the present invention.

In the application scenario shown in FIG. 7, the WFAP sends an NAP request message to the femto managing unit of the NSP, wherein the femto managing unit determines the NAP providing an air interface resource and notifies the WFAP of the access gateway address and/or radio resource managing unit of the NAP. Specifically, FIG. 7 shows the Step 701, wherein after being powered on, the WFAP sends an NAP request message to the femto managing unit of the NSP. Then, in Step 702, the femto managing unit determines the NAP that provides an air interface resource for the WFAP.

Next, in Step 703, the femto managing unit sends an NAP response message to the WFAP. The NAP response message carries one or more of: the ID of the NAP selected in the previous step, IP address of the access gateway of the NAP, or IP address of the radio resource managing unit. Of course, other well know information for determining the NAP may be sent in the NAP response message; and therefore, the aforementioned information included in the response message for selecting or determining an appropriate NAP is used herein for illustrative purposes only and is not meant to limit the scope of the present invention unless otherwise explicitly claimed.

In Step 704, the WFAP may establish a secure connection with the access gateway of the NAP, such as an IPSec connection. Then, in Step 705, the WFAP interacts with the radio resource managing unit of the NAP to obtain the granted radio resource and open the air interface according to the granted radio resource.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for selecting a network access provider (NAP), comprising:
    sending, by a worldwide interoperability for microwave access (WiMAX) femtocell access point (WFAP), an NAP request message to a network service provider (NSP);
    receiving, by the WFAP, an NAP response message returned by the NSP, wherein the NAP response message carries NAP information of an NAP providing an air interface resource for the WFAP, the NAP being determined by the NSP according to at least one of the group consisting of: location information of the WFAP, subscription information of a user, and an NSP-NAP business agreement; and
    establishing, by the WFAP, a connection with the NAP according to the received NAP information.

2. The method according to claim 1, wherein the NAP request message carries the location information of the WFAP.

3. The method according to claim 1, wherein the NAP request message carries a WFAP ID of the WFAP for the NSP authenticating the WFAP according to the WFAP ID.

4. The method according to claim 1, wherein the NAP information comprises at least one of the following: NAP ID, domain name of a network element (NE) in the NAP, and IP address of the NE in the NAP.

5. The method according to claim 1, further comprising:
    opening, by the WFAP, an air interface according to an obtained radio resource granted by the NAP.

6. The method according to claim 5, wherein the step of obtaining, by the WFAP, the radio resource granted by the NAP comprises:
    obtaining, by the WFAP, the granted radio resource directly from the NAP according to the received NAP information; or
    obtaining the granted radio resource from the NAP according to granted radio resource information sent by the NSP, wherein the granted radio resource information is obtained by the NSP from the NAP.

7. A worldwide interoperability for microwave access (WiMAX) femtocell access point (WFAP), comprising:
    a non-transitory computer readable storage medium; and
    a computer processor,
    wherein the non-transitory computer readable storage medium comprises computer executable instructions which are executable by the computer processor to perform the steps:
        sending a network access provider (NAP) request message to a network service provider (NSP);
        receiving an NAP response message returned by the NSP, wherein the NAP response message carries NAP information of a determined NAP providing an air interface resource for the WFAP, the NAP being determined by the NSP according to at least one of: location information of the WFAP, subscription information of a user, and an NSA-NAP business agreement; and
        establishing a connection with an NAP according to the received NAP information.

8. The WFAP according to claim 7, wherein the computer executable instructions are executable by the computer processor to perform the step:
collecting the location information of the WFAP.

9. The WFAP according to claim 7, wherein the computer executable instructions are executable by the computer processor to perform the step:
obtaining a radio resource granted by the NAP.

10. An apparatus for selecting a network access provider (NAP), comprising:
a non-transitory computer readable storage medium; and
a computer processor,
wherein the non-transitory computer readable storage medium comprises computer executable instructions which are executable by the computer processor to perform the steps:
receiving an NAP request message sent by a worldwide interoperability for microwave access (WiMAX) femtocell access point (WFAP);
determining an NAP that provides an air interface resource for the WFAP according to at least one of: location information of the WFAP, subscription information of a user, and an NSA-NAP business agreement; and
returning an NAP response message to the WFAP, wherein the NAP response message carries information of the determined NAP.

11. The apparatus according to claim 10, wherein the computer executable instructions are executable by the computer processor to perform the step of: authenticating the WFAP when the received NAP request message carries an ID of the WFAP.

12. The apparatus according to claim 10, wherein the computer executable instructions are executable by the computer processor to perform, according to the determined NAP, the steps:
obtaining radio resource information granted by the NAP for the WFAP; and
sending the radio resource information to the WFAP.

13. The apparatus according to claim 10, wherein the apparatus is a network service provider (NSP) apparatus.

* * * * *